United States Patent [19]

Mioche

[11] Patent Number: 4,560,338
[45] Date of Patent: Dec. 24, 1985

[54] APPARATUS FOR OBTAINING STRIPS FROM A MATERIAL, PARTICULARLY FROM A LATEX COAGULUM

[75] Inventor: Robert Mioche, Nohanent, France

[73] Assignee: Compagnie Generale des Etablissements Michelin, France

[21] Appl. No.: 555,699

[22] Filed: Nov. 28, 1983

[30] Foreign Application Priority Data

Nov. 29, 1982 [FR] France ............................. 82 20112

[51] Int. Cl.$^4$ ........................................... B29C 67/06
[52] U.S. Cl. .................................... 425/308; 83/871; 264/158; 264/201; 425/311
[58] Field of Search ................. 425/71, 308, 311, 312; 264/201, 206, 184, 157, 158, 171, 142; 83/871

[56] References Cited

U.S. PATENT DOCUMENTS

| | | | |
|---|---|---|---|
| 2,340,243 | 1/1944 | Beal | 264/298 |
| 3,060,501 | 10/1962 | Beal | 264/184 |
| 3,688,500 | 9/1972 | Chancel | 60/54.5 R |
| 3,733,153 | 5/1973 | Moziek | 264/184 |

FOREIGN PATENT DOCUMENTS

| | | |
|---|---|---|
| 0028278 | 5/1981 | European Pat. Off. . |
| 2414021 | 8/1979 | France . |
| 894491 | 4/1962 | United Kingdom . |
| 1168367 | 10/1969 | United Kingdom . |
| 1398424 | 6/1975 | United Kingdom . |
| 2074076 | 10/1981 | United Kingdom . |

Primary Examiner—Jay H. Woo
Assistant Examiner—J. Fortenberry
Attorney, Agent, or Firm—Brumbaugh, Graves, Donohue & Raymond

[57] ABSTRACT

A method for obtaining strips from a material, particularly a latex coagulum, is characterized by raising the material with a fluid via a solid piece arranged below the material and placed directly in contact with the material, and cutting the material into strips above the solid piece by the use of cutting means.

The invention also concerns apparatus for carrying out this method, as well as the strips obtained by this method or with the apparatus.

13 Claims, 4 Drawing Figures

APPARATUS FOR OBTAINING STRIPS FROM A MATERIAL, PARTICULARLY FROM A LATEX COAGULUM

SPECIFICATION

The present invention relates to a method for obtaining strips from a material, these strips being called "sheets" when they are of small thickness as compared with their other dimensions.

By way of example, this material may be a rubber, in particular a rubber obtained by coagulation from a latex, the material being in this case commonly referred to as "coagulum." It should be noted, however, that the invention can be applied to other materials, for instance, plastic materials, foodstuffs, wood, mineral materials and metals.

The known methods employed in natural rubber plantations consist in coagulating the latex in elongated tanks of slight depth. Strips of latex coagulum of a thickness of about 10 cm to 15 cm are thus obtained directly. These strips then undergo the known treatments, for instance, a crushing or a granulation followed by drying.

This method of obtaining strips has the following drawbacks:

in view of the slight depth of the tanks, the coagulation installations require very large areas, which raises problems as to location and makes very high investments necessary;

upon coagulation, the surface/volume ratio of the coagulum is large so that the surface thereof in contact with the air is large, which results in very substantial superficial or surface oxidation of the coagulum and therefore in degradation of the material and a detrimental change in quality.

In order to attempt to eliminate these drawbacks, efforts have been made to obtain thick blocks upon the coagulation and then cut these blocks into strips. Experience shows that this cutting operation encounters substantial difficulties due, in particular, to the flexibility, lack of rigidity and low tensile strength of the coagulum. The handling devices used for the cutting lead, for example, to a crushing or tearing of the coagulum, which raises complex problems of manufacture and results in substantial variations in quality.

The object of the present invention is to overcome these drawbacks.

Therefore, the method of the invention for obtaining strips from a material is characterized by raising the material with a fluid via a solid piece arranged below and directly in contact with the material, and cutting the material into strips above the solid piece by the use of cutting means.

The invention also concerns an apparatus for carrying out the method of the invention as well as the strips obtained by the method and with the apparatus according to the invention.

The following illustrative examples of the invention as well as the entirely schematic figures of the drawing corresponding to these examples are intended to illustrate the invention and facilitate an understanding thereof without, however, limiting its scope.

Figure 1:
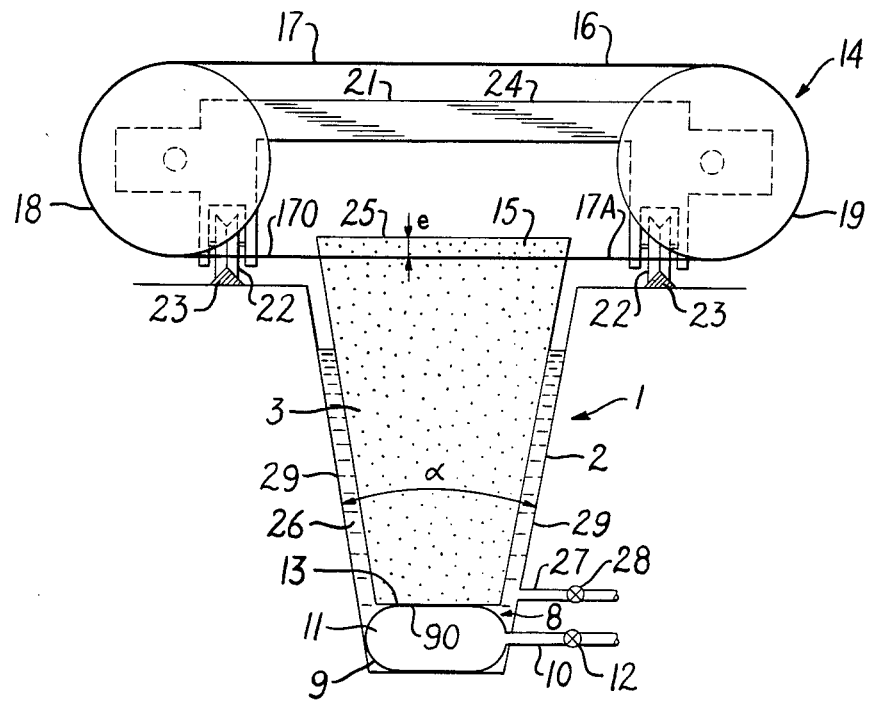
FIG. 1 shows, in vertical section, an apparatus according to the invention, the plane of the section being taken along the line I—I in FIG. 2.
Figure 2:
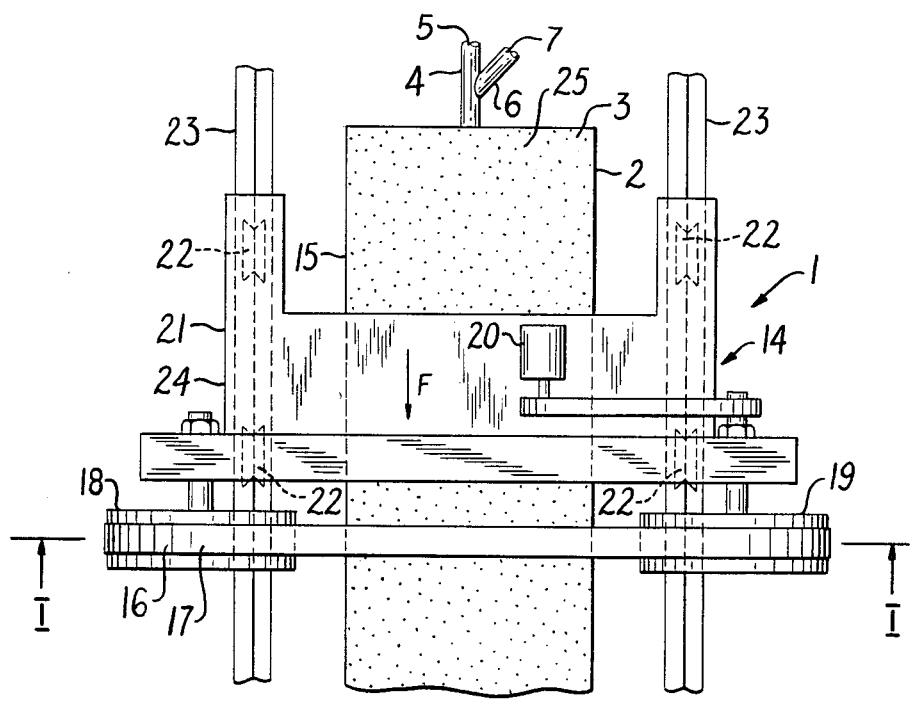
FIG. 2 shows, in the top plan view, the apparatus shown in FIG. 1.

FIGS. 1 and 2 show an apparatus 1 in accordance with the invention. This apparatus 1 comprises a tank 2 of elongated shape, arranged horizontally in the lengthwise direction. Within the tank 2 there is a material 3 which is intended to be cut into strips. By way of example, this material 3 is a block of natural rubber originally obtained directly in the tank 2 by coagulation of a latex introduced into the tank 2. The known means for obtaining this latex coagulum comprise, for instance, a conduit 4 for latex 5 which discharges into one end of the tank 2 and a conduit 6 for coagulating agent 7, said agent being in particular formic acid, acetic acid or a biological agent.

For purposes of homogenization, the conduit 6 for the coagulating agent discharges into the latex conduit 4 (FIG. 2). It goes without saying that other means are possible for the obtaining of the block 3 of coagulum.

The apparatus 1 comprises raising means 8 for raising the material 3. The raising means 8 comprise an inflatable bag 9 arranged below the material 3 and a conduit 10 which makes it possible to introduce a fluid 11, for instance air, into the bag 9 by means of the valve 12 so as to raise the material 3 with the fluid 11 in the bag 9 which is directly in contact with the lower face 13 of the material 3. The bag 9 forms an air chamber whose wall 90, formed, for instance, of vulcanized rubber, behaves as an intermediate solid elastic piece arranged between the air 11 and the material 3 and placed directly in contact with the material 3 (FIG. 1).

The apparatus 1 has cutting means 14 for cutting strips 15 from the material 3 located above the bag 9.

These cutting means 14 comprise a band saw 16 with a band 17 wound around two flywheels 18, 19, this band 17 having a cutting edge 170 which is preferably without teeth.

The flywheel 19 is driven by the motor 20. The assembly consisting of the flywheels 18, 19 and the motor 20 is fastened on a chassis 21, in its turn mounted on four wheels 22 which travel on two horizontal rails 23 arranged along the upper part of the tank 2, on opposite sides of the tank 2. The chassis 21 and the wheels 22 therefore constitute a carriage 24 which is movable horizontally over the tank 2 and along the entire length of the tank 2.

The equipment for displacing the carriage 24 along the material 3 on the rails 23 is not shown in the drawing for purposes of simplification, this equipment comprising, for instance, a winch.

The lower portion 17A of the band 17 has a horizontal orientation and the cutting edge 170 of this lower portion 17A makes it possible to cut the material 3 horizontally above the bag 9 so as to obtain a strip 15 upon the displacement of the carriage 24 in the direction indicated by the arrow F. After the strip 15 has been cut, it is shifted laterally by known means, not shown in the drawing for purposes of simplification, such means being, for instance, a conveyor belt or a flotation tank. A further amount of fluid 11 is then introduced into the bag 9 so as to raise the material 3 to the desired height in such a way, for instance, that the upper face 25 of the material 3 reaches the same level as it had before the preceding cut, and a new strip 15 is cut. The thickness "e" of the strips 15 is determined by the amount of fluid 11 introduced into the bag 9. The thickness "e" can also be adjusted by changing the height of the lower portion 17A of the band 17 by known means (not shown in the drawing), this adjustment of the height being obtained, for instance, by vertical displacement of the flywheels 18, 19.

It is possible to develop the raising means 8 in such a manner that they make it possible to introduce a fluid 26 into the tank 2 through a conduit 27 and a valve 28 in such a manner that this fluid 26 is directly in contact with the material 3 above the bag 9, this fluid 26 being, for instance, a liquid, in particular water. The weight borne by the bag 9 is thus decreased as a result of buoyancy, which facilitates the raising of the material 3. The valve 28 makes it possible to vary the amount of fluid 26 in the tank 2 upon the cutting operations. One could also modify the density of this fluid 26, in particular by using a saltwater feed (not shown in the drawing).

During the raising of the material 3 it is advantageous to have the fluid 26 penetrate below the bag 9 in order to ascend the bag 9, this bag 9 remaining in contact with the material 3 upon the ascent of the bag 9. The conduit 10 must then be sufficiently long and flexible to permit this ascent of the bag 9. One thus obtains a uniform raising of the material 3 over the entire length of the tank 2.

The distance between the opposite sidewalls 29 of the tank 2, which are arranged parallel to the rails 23, preferably increases in upward direction, forming an angle $\alpha$ so as to facilitate the upward movement of the block 3. This angle $\alpha$ preferably has a value such that the sidewalls 29 retain their guide role during all the successive cuttings.

The angle $\alpha$ which these sidewalls 29 form with each other varies, for instance, from 2° to 10°, and preferably from 2° to 5°. The distance between the sidewalls 29 and the material 3 has been exaggerated in FIG. 1 in order to make the drawing clearer.

The advantages obtained by the apparatus 1 are the following:

(1) The cutting is effected without handling the material 3, so that no crushing of the material is produced despite the flexible, nonresistant structure of the coagulum. It is, therefore, possible to effect the cutting of the strips from thick blocks obtained by coagulation of the latex in tanks 2 which are in practice as deep as desired. Thus, for instance, strips have been cut from blocks of coagulum of about 25 m in length, 60 cm in width, and 1 m in thickness, namely, a total weight of the blocks of about 15 tons, these blocks being obtained in tanks 2 having practically the same dimensions as the blocks. The thickness of the blocks corresponds practically to the depth of the corresponding tanks. In the event that the sidewalls 29 of the tank 2 form an angle $\alpha$ which is other than zero, the width of the tank is determined at the level of its median depth. By way of example, the known techniques for the direct obtaining of strips by coagulation give blocks of only about 1.5 tons. The invention, therefore, makes it possible to reduce the areas necessary for latex coagulation installations by a factor of about 10, which obviously results in considerably reduced investment and operating expenses.

The above figures concerning the carrying out of the invention are furthermore given merely by way of example; one can in fact contemplate tanks having a depth which is definitely greater than 1 m and of any length, which may be far greater than 25 m. The width of the blocks may be any desired value, since it is limited only by the structure of the cutting means.

(2) The invention makes it possible to treat thick blocks, that is to say blocks of a small surface/volume ratio. The superficial or surface oxidation of the coagulum by the air is thus considerably reduced. This advantage combined with the practically complete absence of crushing upon the cutting, leads to a rubber whose quality is both uniform and satisfactory.

(3) The invention makes it easily possible to vary as desired the thickness "e" of the strips 15 and to do so within wide limits, the thickness "e" which is most commonly used varying, for instance, from 10 cm to 20 cm, and without there being any loss since the raising means in accordance with the invention make it possible to raise the material 3 uniformly over its entire length until the entire material is cut, and this even if the material 3 has heterogeneities over its length.

When it is desired to obtain strips of small thickness, that is to say sheets, whose thickness varies, for instance, from 1 cm to 10 cm, it may be useful to use, together with the invention, the technique described in French patent application No. 82/10,283, filed June 10, 1982 (which corresponds to U.S. Pat. No. 4,513,648—the entire disclosure of which is hereby incorporated by reference herein), which technique consists in producing a depression on a portion of the material 3 by the use of depressing means and cutting the material into strips (sheets) in the depressed portion of the material, the thickness of the strips (sheets) being adjusted by varying the difference in height between the level of the depressing means and the level of the cutting means in the depressed portion. By way of example, the depressing means are formed, at least in part, of a cylindrical roller which rests on the upper face 25 of the material 3, this roller being arranged above the cutting edge 170 of the lower portion 17A of the band 17 and being mounted on the carriage 24. This roller rolls on the upper face 25, so that upon displacement of the carriage 24 the depressed portion moves along the material 3, the thickness "e" of the strip (sheet) obtained varying as a function of the difference in height between the level of the lower generatrix of the roller and the level of the cutting edge 170 of the lower portion 17A of the band 17.

The bag 9 preferably extends over practically the entire length of the tank 2 and is arranged at the bottom of the empty tank 2.

The latex intended for the coagulation is then introduced into the tank 2 on top of the deflated bag 9. The bag 9 is thus, of course, located below the coagulated mass 3 which it can easily raise upon the introduction of the fluid 11.

Figure 3:
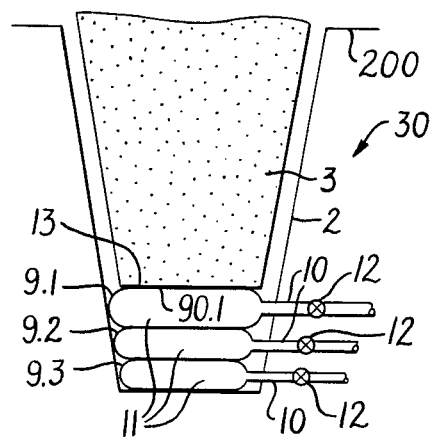
FIG. 3 shows, in vertical section, a part of another apparatus in accordance with the invention.

It may be advantageous to use, instead of a single bag, a plurality of superimposed bags as shown in cross-section in FIG. 3. In this figure, there can be noted a part of an apparatus 30 comprising three bags, marked 9.1, 9.2 and 9.3, arranged below the material 3. The bag 9.1 is directly in contact with the material 3, the bag 9.3 is the lowest and the bag 9.2 is the intermediate bag which is in contact with the bags 9.1 and 9.3. Each of these bags has a conduit 10 and a valve 12 which are specific to it. It is thus possible to inflate these bags in succession during the cutting operation, commencing, for instance, by inflating the lowermost bag 9.3. This technique may have the advantage of assuring a uniform raising of the material 3 even if the tank 2 is very long, each of these bags extending practically over the entire length of the tank 2. It goes without saying that these bags may form a single unit, in the form, for instance, of a single bag comprising several airtight internal partitions which form unit bags.

Instead of using several conduits 10, it is possible to use a single conduit 10 which feeds the lower bag 9.3, each bag being connected to the next higher bag by a calibrated valve, the calibration pressure increasing from one bag to the next higher bag.

It is possible to provide raising means in such a manner that upon the inflation of the bags 9.1, 9.2, 9.3, the variation in height of this group of bags is sufficient to permit the cutting of the entire block of material 3 into strips when it is raised by these bags. This may be the case, for instance, when, in inflated condition, the top 90.1 of the upper bag 9.1 arrives practically at the level of the top 200 of the tank 2 or even rises above that level. It is thus possible to cut the material 3 entirely into strips without using the fluid 26, while guaranteeing a uniform accent of this material 3 over the entire length of the tank 2. This solution is advantageous in cases in which fluid 26, for instance water, is difficult to find, it then being possible to install the device 30 in regions which have no water.

Figure 4:
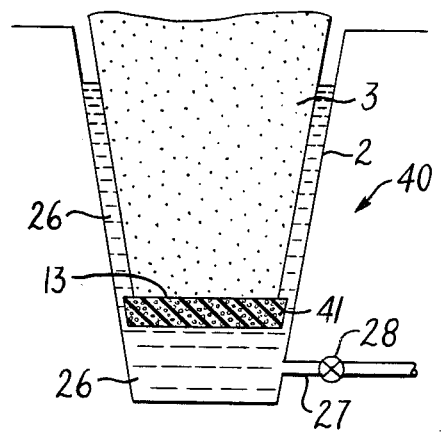
FIG. 4 shows, in vertical section, a part of yet another apparatus in accordance with the invention.

The invention is not limited to the cases in which inflatable bags are used. FIG. 4, for instance, shows, in cross-section, a portion of an apparatus 40 according to the invention; this apparatus 40 has a lightweight mass 41, for instance, a slab of polyurethane or polystyrene foam, which floats in the liquid 26 while being applied against the lower face 13 of the material 3 as a result of buoyancy, the great floatability of this slab 41 causing the ascent of the material 3 after each cut. This technique may have the advantage of simplicity, by selecting for the slab 41 a material whose density is far less than that of the liquid 26, and it is preferable that the material 3 have a density less than that of the liquid 26 so that it also floats in the liquid 26, which is true of coagulum which floats in water since the density of the coagulum varies practically from 0.6 to 0.9, the density of the material 3 being, however, greater than that of the slab 41.

When the slab 41 is located at the bottom of the tank 2 and covered by latex, it is necessary to tie this slab to the bottom of the tank, for instance, by means of a lateral locking, in order to avoid its rising to the surface of the latex before coagulation.

The invention also covers the case in which equipment is used which makes it possible to displace the carriage in a direction other than along the length of the material 3, as described in, French patent application No. 82/10,283 (U.S. Pat. No. 4,513,648) mentioned above, this equipment comprising, for instance, a roller connected to one end of the carriage 24 and an apparatus which makes it possible to modify the height of this roller in such a way that it is applied against a rail perpendicular to the rails 23, which makes it possible to arrange the carriage 24 above another tank so as to effect another cutting of strips.

It goes without saying that means other than saws can be contemplated for cutting the strips, for instance, possibly heated wires.

The invention is, of course, not limited to the embodiments described above.

What is claimed is:

1. An apparatus for obtaining strips from a material, characterized by the following features:
   (a) said apparatus comprises raising means for raising the material with a fluid via a solid piece arranged below the material and placed directly in contact with the material;
   (b) said raising means further comprise means for placing a liquid directly in contact with the material above the solid piece and below the solid piece in order to ascend the solid piece as a result of buoyancy;
   (c) said solid piece comprises at least one inflatable bag;
   (d) said apparatus comprises cutting means for cutting the material into strips above the solid piece;
   (e) said apparatus comprises means for mounting the cutting means and for displacing the cutting means along the material.

2. An apparatus for obtaining strips from a material, characterized by the following features:
   (a) said apparatus comprises raising means for raising the material with a fluid via a solid piece arranged below the material and placed directly in contact with the material;
   (b) said raising means further comprise means for placing a liquid directly in contact with the material above the solid piece and below the solid piece in order to ascend the solid piece as a result of buoyancy;
   (c) said solid piece comprises a slab, the density of the slab being less than the density of the liquid and the density of the material;
   (d) said apparatus comprises cutting means for cutting material into strips above the solid piece;
   (e) said apparatus comprises means for mounting the cutting means and for displacing the cutting means along the material.

3. An apparatus according to claim 1, characterized by the fact that the bag is capable of being inflated with air.

4. An apparatus according to claim 1, characterized by the fact that the raising means make it possible to inflate the bag or bags in such a manner that the variation in height of the bag or of the group of bags is sufficient to make it possible to cut all the material into strips when the material is raised by the bag or bags.

5. An apparatus according to claim 1, characterized by the fact that the raising means comprise a plurality of superimposed inflatable bags, each bag being connected to the next higher bag by a calibrated valve, the calibration pressure increasing from one bag to the next higher bag.

6. An apparatus according to claim 1 or 2 characterized by the fact that the raising means comprise a tank in which the material and the solid piece are arranged.

7. An apparatus according to claim 6, characterized by the fact that opposite sidewalls of the tank extend away from each other in upward direction and form an angle α with each other.

8. An apparatus according to claim 7, characterized by the fact that the angle α formed by the sidewalls varies from 2° to 10°.

9. An apparatus according to claim 8, characterized by the fact that the angle α varies from 2° to 5°.

10. An apparatus according to claim 1 or 2, characterized by the fact that the cutting means comprise a band saw.

11. An apparatus according to claim 10, characterized by the fact that the band of the saw is without teeth.

12. An apparatus according to claim 1 or 2, characterized by the fact that said apparatus further comprises a carriage on which the cutting means are mounted, and means for displacing the carriage along the material.

13. An apparatus according to claim 1 or 2, characterized by the fact that said apparatus comprises a tank, means for placing the solid piece on the bottom of the tank, means for introducing a latex to be coagulated into the tank over the solid piece, means for coagulating the latex, and means for introducing the fluid into the tank so as to raise the latex coagulum material with the fluid via the solid piece.

* * * * *